United States Patent
Yacoub et al.

(10) Patent No.: US 12,175,412 B2
(45) Date of Patent: Dec. 24, 2024

(54) METHODS AND SYSTEMS FOR SMART API POLLING FOR PREDICTED DELIVERY EVENTS

(71) Applicant: SHOPIFY INC., Ottawa (CA)

(72) Inventors: George Yacoub, Mississauga (CA); Peng Yu, Montreal (CA); Ali Kiyan Azarbar, Toronto (CA); Vahe Khachikyan, Vaughan (CA); Siavash Ghorbani, Toronto (CA)

(73) Assignee: SHOPIFY INC., Ottawa (CA)

( * ) Notice: Subject to any disclaimer, the term of this patent is extended or adjusted under 35 U.S.C. 154(b) by 11 days.

(21) Appl. No.: 18/489,912

(22) Filed: Oct. 19, 2023

(65) Prior Publication Data

US 2024/0046197 A1    Feb. 8, 2024

Related U.S. Application Data

(63) Continuation of application No. 16/991,185, filed on Aug. 12, 2020, now abandoned.

(51) Int. Cl.
*G06Q 10/0833* (2023.01)
*G06Q 10/083* (2023.01)
*G06Q 10/0835* (2023.01)

(52) U.S. Cl.
CPC ..... *G06Q 10/0833* (2013.01); *G06Q 10/0835* (2013.01); *G06Q 10/0838* (2013.01)

(58) Field of Classification Search
CPC ............... G06Q 10/08; G06Q 10/0833; G06Q 10/083; G06Q 10/08355
See application file for complete search history.

(56) References Cited

U.S. PATENT DOCUMENTS

| | | | |
|---|---|---|---|
| 10,579,955 B1* | 3/2020 | Wier | G06N 7/01 |
| 11,107,029 B1* | 8/2021 | Henry | H04L 47/783 |
| 2003/0097287 A1 | 5/2003 | Franz et al. | |
| 2005/0218221 A1 | 10/2005 | Nark et al. | |
| 2006/0229895 A1* | 10/2006 | Kodger, Jr. | G06Q 10/083 |
| | | | 705/333 |

(Continued)

OTHER PUBLICATIONS

Owen-Cooper, Teresa. "First-Class Computer Technology Helping Mail Get through More Efficiently." Colorado Springs Gazette—Telegraph, Feb. 27, 1994, p. CC.3. ProQuest. Web. Oct. 3, 2024 https://dialog.proquest.com/professional/docview/268072823?accountid=131444 (Year: 1994).*

*Primary Examiner* — Michael P Harrington

(57) ABSTRACT

When a merchant ships a product to a buyer, the merchant may wish to push shipping status updates to the buyer. Moreover, the buyer may wish to receive a notification when a shipping event has occurred in order to remain informed regarding the shipping status of their package without actively checking the package's status with the carrier. In some embodiments, there is provided a computer-implemented system and method that obtains a tracking identifier for a package, transmits the tracking identifier to a carrier's computing interface (e.g. the carrier's API), receives back an indication of the most recent shipping event, predicts the time of a next shipping event at least based on the most recent shipping event, and retransmits the tracking identifier to the computing interface based on the predicted time of the next shipping event.

13 Claims, 12 Drawing Sheets

(56) References Cited

U.S. PATENT DOCUMENTS

| | | | |
|---|---|---|---|
| 2013/0212603 A1* | 8/2013 | Cooke | G06F 9/542 |
| | | | 719/328 |
| 2015/0046361 A1 | 2/2015 | Williams et al. | |
| 2015/0066798 A1* | 3/2015 | Gillen | G06Q 10/0835 |
| | | | 705/336 |
| 2018/0165635 A1 | 6/2018 | Modica et al. | |
| 2019/0213538 A1* | 7/2019 | Bebout | G06Q 10/0835 |
| 2020/0349510 A1* | 11/2020 | Dhonde | G06K 19/06028 |

* cited by examiner

| E-Commerce Platform | Q Search | | JG John's Apparel / Jonny B. Good |
|---|---|---|---|
| ⌂ Home | | All channels ⌄ | Today ⌄ |
| Orders | | | |
| ◇ Products | Good afternoon, Jonny B.. | TOTAL SALES | Jun 1 |
| ○◦ Customers | Here's what's happening with your store today. | $98.00 | 2 orders |
| ╌┨ Reports | | $125 | |
| ⚙ Discounts | Today's total sales  Today's visits | $75 | |
| ▦ Apps | $98.00  1 | $25 | |
| SALES CHANNELS ⊕ | | 12am 4pm 8pm 11pm | |
| ▤ Online Store ◆ | ● Update your Platform Payments tax details | TOTAL SALES BY CHANNEL | View dashboard |
| ▢ Mobile App | We require additional information to verify your identity. | Online Store | Jun 1 |
| View all channels | [ Update tax details ] | $0.00 | 0 orders |
| | | Mobile app | |
| | ● Advanced Cash on Delivery has been deactivated for your store | $0.00 | 0 orders |
| | [ See why ] | Shopify POS (126 York St.) | |
| | | $0.00 | 0 orders |
| ⚙ Settings | | | |

Tracking Identifier = 1Z28W7772027341888 ; Carrier = UPS

| Event 406 | Location 408 | Date/Time Stamp 410 |
|---|---|---|
| Pickup | San Francisco, USA | Apr 20, 2020 10 AM |
| Arrive at San Francisco Depot | San Francisco, USA | Apr 20, 2020 1 PM |
| Depart San Francisco Depot | San Francisco, USA | Apr 20, 2020 6 PM |
| Arrive Los Angeles Depot | Los Angeles, USA | Apr 20, 2020 11:30 PM |
| Depart Los Angeles Depot | Los Angeles, USA | Apr 21, 2020 5:45 AM |
| Arrive Toronto Depot | Toronto, Canada | Apr 21, 2020 4 PM |
| Arrive Customs | Toronto, Canada | Apr 21, 2020 5 PM |
| Clear Customs | Toronto, Canada | Apr 21, 2020 10 PM |
| Depart Toronto Depot | Toronto, Canada | Apr 22, 2020 8 AM |
| Arrive Ottawa Depot | Ottawa, Canada | Apr 22, 2020 2 PM |
| Out for delivery | Ottawa, Canada | Apr 23, 2020 9 AM |
| Delivered | Ottawa, Canada | Apr 23, 2020 10:30 AM |

FIG. 5

| Package Tracking Model – Standard Mail Class, Spring (April – June) ||||
|---|---|---|---|
| Carrier 602 | Event 1 604 | Event 2 606 | Average Duration Between Events 608 |
| USPS | Pick-Up | Arrive at San Francisco Depot | 1.2 hr |
| | Pick-Up | Arrive at San Jose Depot | 1.6 hr |
| | Pick-Up | Arrive at Los Angeles Depot | 2.4 hr |
| | Pick-Up | Arrive at San Diego Depot | 0.8 hr |
| | ... | ... | ... |
| | Arrive at San Francisco Depot | Depart San Francisco Depot | 6 hr |
| | Arrive at San Jose Depot | Depart San Jose Depot | 2.5 hr |
| | Arrive at Los Angeles Depot | Depart Los Angeles Depot | 8.5 hr |
| | Arrive at San Diego Depot | Depart San Diego Depot | 3 hr |
| | ... | ... | ... |
| | Depart San Jose Depot | Delivered to Recipient | 4.1 hr |
| | Depart San Jose Depot | Arrive at San Francisco Depot | 1.3 hr |
| | Depart Los Angeles Depot | Delivered to Recipient | 6.2 hr |
| | Depart Los Angeles Depot | Enter Canadian Customs | 14 hr |
| | Depart San Diego Depot | Delivered to Recipient | 2.5 hr |
| | Depart San Diego Depot | Arrive at Phoenix Depot | 6.7 hr |
| | Depart San Diego Depot | Arrive at Los Angeles Depot | 2.4 hr |
| Canada Post | Clear Canadian Customs | Arrive at Toronto Depot | 0.2 hr |
| | Arrive at Toronto Depot | Depart Toronto Depot | 4.4 hr |
| | Arrive at Ottawa Depot | Depart Ottawa Depot | 3 hr |
| | ... | ... | ... |
| | Depart Toronto Depot | Delivered to Recipient | 5.1 hr |
| | Depart Toronto Depot | Enter USA Customs | 2.3 hr |
| | Depart Toronto Depot | Arrive at Ottawa Depot | 5.5 hr |
| | ... | ... | ... |
| | Depart Ottawa Depot | Delivered to Recipient | 4.6 hr |
| FedEx | ... | ... | ... |
| UPS | ... | ... | ... |
| DHL | ... | ... | ... |
| Purolator | ... | ... | ... |

FIG. 7

| Package Tracking Model – Standard Mail Class, Increased traffic seasons ||||
| Carrier 702 | Event 1 704 | Event 2 706 | Average Duration Between Events 708 |
| --- | --- | --- | --- |
| USPS | Pick-Up | Arrive at San Francisco Depot | 1.8 hr |
| | Pick-Up | Arrive at San Jose Depot | 2.3 hr |
| | Pick-Up | Arrive at Los Angeles Depot | 2.9 hr |
| | Pick-Up | Arrive at San Diego Depot | 1.4 hr |
| | ... | ... | ... |
| | Arrive at San Francisco Depot | Depart San Francisco Depot | 14.2 hr |
| | Arrive at San Jose Depot | Depart San Jose Depot | 10.5 hr |
| | Arrive at Los Angeles Depot | Depart Los Angeles Depot | 16 hr |
| | Arrive at San Diego Depot | Depart San Diego Depot | 7.1 hr |
| | ... | ... | ... |
| | Depart San Jose Depot | Delivered to Recipient | 6.9 hr |
| | Depart San Jose Depot | Arrive at San Francisco Depot | 1.3 hr |
| | Depart Los Angeles Depot | Delivered to Recipient | 9.7 hr |
| | Depart Los Angeles Depot | Enter Canadian Customs | 14 hr |
| | Depart San Diego Depot | Delivered to Recipient | 5.4 hr |
| | Depart San Diego Depot | Arrive at Phoenix Depot | 6.7 hr |
| | Depart San Diego Depot | Arrive at Los Angeles Depot | 2.4 hr |
| Canada Post | Arrive at Toronto Depot | Depart Toronto Depot | 10.5 hr |
| | Arrive at Ottawa Depot | Depart Ottawa Depot | 7.6 hr |
| | ... | ... | ... |
| | Depart Toronto Depot | Delivered to Recipient | 8.9 hr |
| | Depart Toronto Depot | Enter USA Customs | 2.3 hr |
| | Depart Toronto Depot | Arrive at Ottawa Depot | 5.5 hr |
| | ... | ... | ... |
| | Depart Ottawa Depot | Delivered to Recipient | 6.8 hr |
| FedEx | ... | ... | ... |
| UPS | ... | ... | ... |
| DHL | ... | ... | ... |
| Purolator | ... | ... | ... |

FIG. 8

METHODS AND SYSTEMS FOR SMART API POLLING FOR PREDICTED DELIVERY EVENTS

CROSS-REFERENCE TO RELATED APPLICATIONS

This application is a continuation of U.S. patent application Ser. No. 16/991,185, entitled "Methods and Systems for Smart API Polling for Predicted Delivery Events", which was filed on Aug. 12, 2020, and which is incorporated herein by reference.

FIELD

The present application relates to adjusting application programming interface (API) call rates to a carrier's package tracking system.

BACKGROUND

A computer-based system may be used by a carrier to track a package being shipped by that carrier. For example, a carrier may have a package tracking system, with each package being assigned a different tracking identifier that uniquely identifies that package in the tracking system. A shipping status is stored in association with the tracking identifier. The shipping status provides a status of a stage or phase that the package is in during the shipping process and/or where the package is in the shipping process, e.g. at a particular depot, in customs, out for delivery, etc. The shipping status may be stored as part of a shipping record for that package.

The unique tracking identifier may be encoded in a machine-readable code, such as a barcode or quick response (QR) code. The machine-readable code is typically included on the shipping label affixed to the outside of the package. Whenever a shipping event occurs during the shipping process, e.g. the package arrives at or leaves a depot, the machine-readable code is read by a device at the event location and the shipping status is updated.

The tracking identifier may be provided to an interested party, such as the buyer. The buyer can transmit the tracking identifier over a computer network to the package tracking system and retrieve the shipping status (including potentially one or more of a stage or phase identifier (e.g., in transit, in customs, etc.), a location and/or an overall sequence of scanned events as the package travels along its journey to its destination). For example, a carrier may have a website that allows for a buyer to enter the tracking identifier, and in response the shipping status is provided for display on the website.

SUMMARY

When a merchant ships a product to a buyer, the merchant may wish to send (i.e. "push") shipping status updates to the buyer, e.g. via email or to a software application installed on the buyer's device. In this way, the buyer does not need to use a tracking identifier to actively check the shipping status, but instead the buyer is notified whenever there is a change in shipping status.

The merchant may use the tracking identifier to make a request ("call") to an application programming interface (API) of the carrier. The API returns the shipping status for the package associated with that tracking identifier. However, a carrier typically places a limit on how many API requests can be made by a same entity, e.g. by a same e-commerce platform.

In some embodiments, systems and methods are disclosed in which the timing of a change in shipping status is predicted for a package being tracked. For example, the time of the next shipping event is predicted based at least on the most recent shipping event. Then, one or more requests (e.g. API requests) for the shipping status of that package are sent based on the predicted time of the next shipping event. For example, one or more API requests may be sent in a time window during which the next shipping event is predicted to occur. The frequency of the requests may increase closer to the time at which the next shipping event is predicted to occur.

In one embodiment, a computer implemented method is provided. The method may include obtaining a tracking identifier for a package. The method may further include transmitting the tracking identifier to a computing interface provided by a carrier. In response, an indication may be received of a most recent shipping event for the package. Then, the method may include generating a predicted time of a next shipping event for the package, where the predicted time is generated based at least on the most recent shipping event. The method may further include retransmitting the tracking identifier to the computer interface. The retransmitting may occur at a time that is selected based on the predicted time of the next shipping event.

A system is also disclosed that is configured to perform the methods disclosed herein. For example, the system may include a memory to store information (e.g. to store the tracking identifier) and at least one processor to directly perform (or instruct the system to perform) the method steps. A computer-readable medium is also disclosed having computer-executable instructions stored thereon that, when executed by at least one processor, cause the at least one processor to perform methods disclosed herein.

Note that a carrier, as used herein, may alternatively be referred to as a shipper. A shipping status may alternatively be referred to as a delivery status or a package status. A shipping event may alternatively be referred to as a delivery event. A buyer may alternatively be referred to as a customer. Also, a 'depot' as used herein encompasses any facility in which a package is temporarily held during the shipping process. For example, a depot may be a fulfillment center, a warehouse, a storage facility, a terminal, etc.

BRIEF DESCRIPTION OF THE DRAWINGS

Embodiments will be described, by way of example only, with reference to the accompanying figures wherein:

FIG. 2 is illustrates a home page of an administrator, according to one embodiment;

FIG. 5 illustrates an example of a shipping record for a previously shipped package;

FIGS. 6 to 8 illustrate package tracking models according to various embodiments;

DETAILED DESCRIPTION

For illustrative purposes, specific example embodiments will now be explained in greater detail below in conjunction with the figures.

Example e-Commerce Platform

The methods disclosed herein may be performed in relation to a commerce platform, which will be referred to herein as an e-commerce platform. Therefore, an example of an e-commerce platform will first be described.

Figure 1:
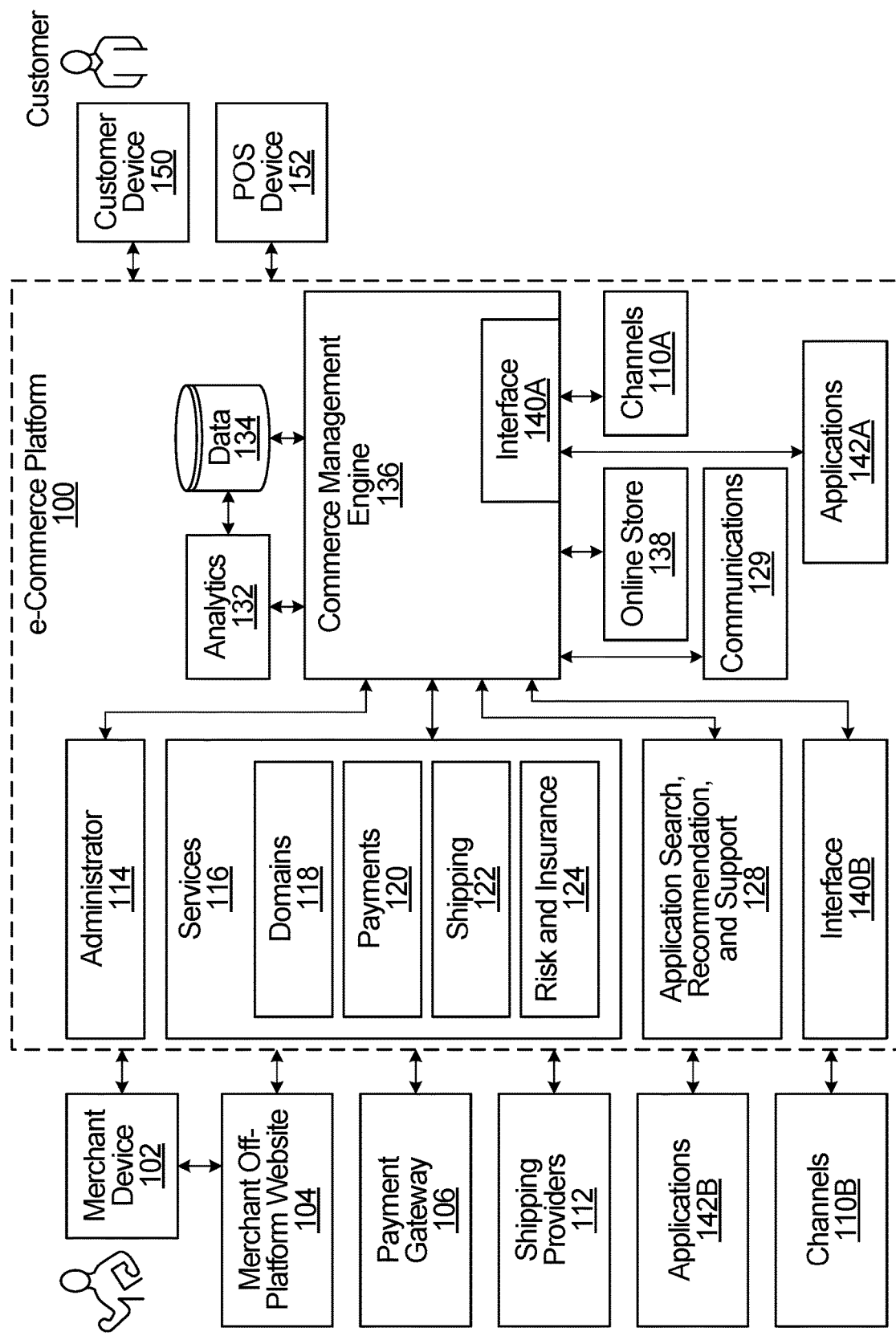
FIG. 1 is a block diagram of an e-commerce platform, according to one embodiment.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Tracking Shipment Data and Providing it to the Customer in the e-Commerce Platform 100

A merchant may wish to provide up-to-date shipping event data to a customer after shipping a product. Likewise, the customer may wish to be notified when shipping events have occurred without the use of a tracking identifier and without actively checking the shipping status. In order to provide this information to the customer, the e-commerce platform 100 may issue a notification to the customer when there is a change in shipping status. The shipping status may be tracked within the e-commerce platform 100 using the commerce management engine 136. The notification may be presented to the customer using a user interface on their customer device 150. The notification may include an e-mail or a push notification sent to a software application on the customer device 150.

Figure 3:
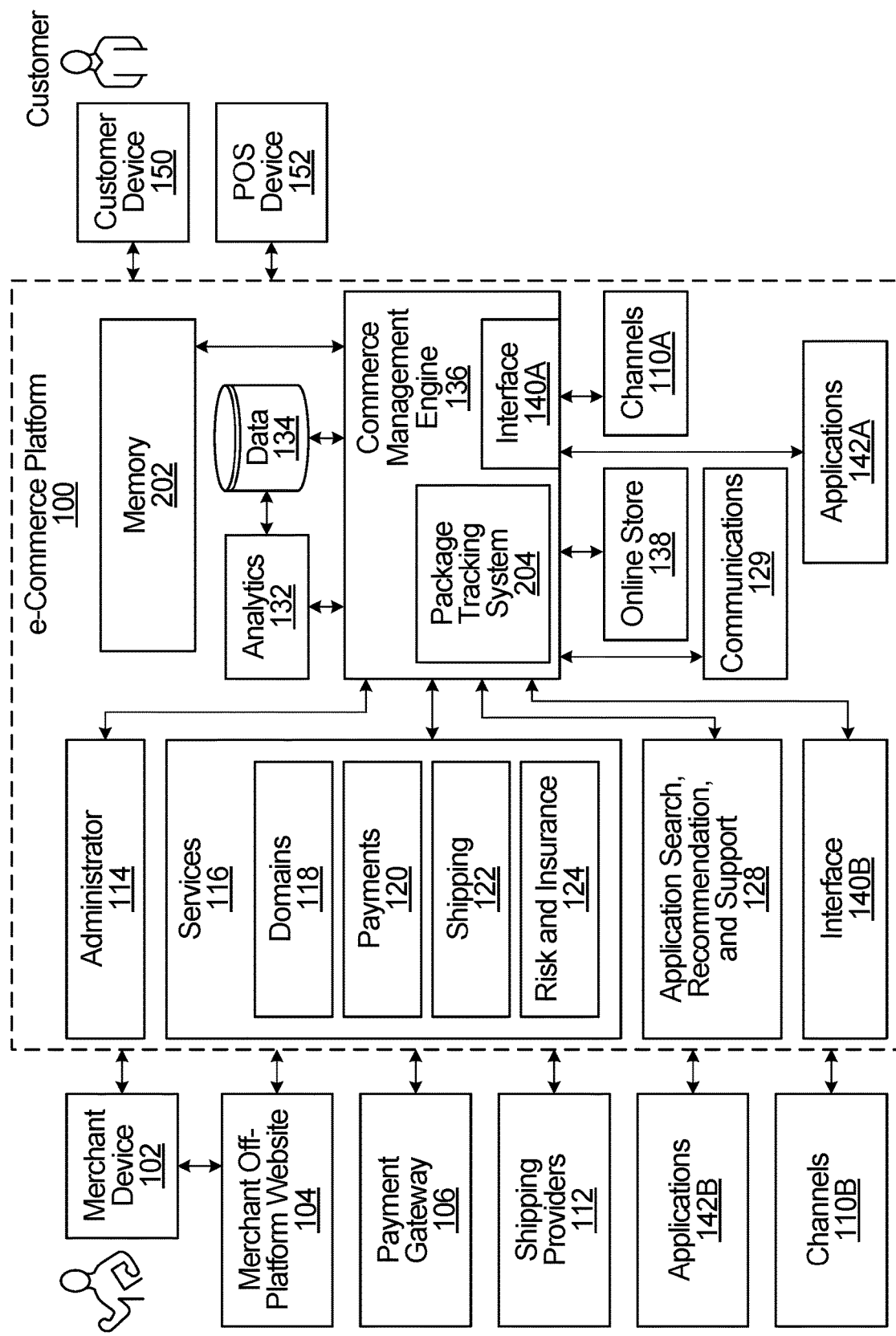
FIG. 3 illustrates the e-commerce platform of FIG. 1, but with a memory and a package tracking system.

FIG. 3 illustrates the e-commerce platform 100 of FIG. 1, but with the additions of a memory 202 and a package tracking system 204. These additional components may be part of or in two-way communication with the commerce management engine 136.

The package tracking system 204 performs the package tracking methods disclosed herein. For example, the package tracking system 204 may determine whether a package containing a product purchased from the merchant's online store 138 has been picked up by the carrier to be brought to the nearest shipping depot and, if so, what time this event took place. The package tracking system 204 may make API calls to a carrier API in order to track shipping events related to the package.

The package tracking system 204 may be implemented by one or more general-purpose processors that execute instructions stored in a memory (e.g. in memory 202) or stored in another non-transitory computer-readable medium. The instructions, when executed, cause the package tracking system 204 to perform the operations of the package tracking system 204, e.g. operations relating to the tracking of shipping events for a product purchased by a customer from a merchant's online store 138. Alternatively, some or all of the package tracking system 204 may be implemented using dedicated circuitry, such as an application specific integrated circuit (ASIC), a graphics processing unit (GPU), or a programmed field programmable gate array (FPGA). In some embodiments, the package tracking system 204 and/or the memory 202 may be located externally to the e-commerce platform 100. In some embodiments, the memory 202 may be part of the package tracking system 204.

In some embodiments, the package tracking system 204 within the e-commerce platform 100 is used to implement the process of determining if a shipping event has occurred for a package, and, if so, providing details of the shipping event to the customer. The package tracking system 204 may use the tracking identifier of the package to send a request to an API of a tracking system implemented by the carrier that is delivering the package. The request sent to the carrier's API may be referred to as a "call" or "API call". The API then returns the shipping status for the package associated with the tracking identifier. The shipping status indicates the most recent shipping event for that package. For example, a most recent shipping event for a package may be "Departed Los Angeles Depot Apr. 21, 2020 5:45 AM". The shipping status may be stored in memory 202 of the e-commerce platform 100. If the shipping status has changed since the last API request, then the updated shipping status may be transmitted to the customer via the customer device 150.

The memory 202 linked with the commerce management engine 136 may include a package tracking model, completed shipping records, and current shipping event data. The data stored in the memory 202 may be established and maintained either in real time or non-real time, and may be used to assist in predicting whether a shipping event has occurred and whether an API request should be issued, e.g. as explained later.

A carrier typically places a limit on how many API requests can be made by a singular entity, where an e-commerce platform such as e-commerce platform 100 may be considered a singular entity. For example, the package tracking system 204 of the e-commerce platform 100 may only be permitted to make 500 API requests per minute to the API of a particular carrier. However, if many packages (e.g. tens of thousands of packages) are being shipped by that carrier and tracked by the package tracking system 204, then the API request rate might be bottlenecked, particularly if the package tracking system 204 is attempting to make continual delivery status requests for each package.

In a previous implementation, a round-robin approach may have been utilized. For instance, 500 API requests may be sent by the package tracking system 204 in the first minute for a first set of 500 packages being tracked, then another 500 API requests are sent in the second minute for a different set of 500 packages being tracked, etc., proceeding in turn.

In an alternative previous implementation, a back-off algorithm may be used by the package tracking system 204 to limit repeated API calls. However, the back-off algorithm may sometimes result in long periods of time between API calls, which may result in a delay in obtaining a shipping status update, e.g. if the package moved from one location to another during the long interval between adjacent API calls.

In a yet further alternative previous implementation, an approach based on scheduled turns may have been utilized. In this approach, packages with a particular status were assigned to be polled with a certain frequency. That certain frequency may have been determined based on package status independent of one or more other considerations such as, for example, carrier, time of day, history for the package, or the like. Notably, such an approach may result in unnecessary polling and/or the intended frequency of polling may not have been possible to satisfy without violating API request frequency and/or bottlenecking.

Moreover, regardless of whether the approaches used in these previous implementations allow the e-commerce platform 100 to stay under the API request rate limit, computer resources (e.g., computing resources used in servicing/responding to API requests) are wasted by sending API requests unnecessarily. For example, if the shipping status of a package changed to "arrived at customs" at 9:30 AM, it is not necessary to send another API request checking the status of that package at 10 AM if it is known to typically take much longer than 30 minutes to clear customs. Sending API requests unnecessarily is referred to as over polling. Additionally or alternatively, as mentioned above, API calls for packages that should be updated may not be satisfiable within request rate limits, resulting in stale information.

To address the technical problem above, in some embodiments the timing of a change in shipping status may be predicted for a package being tracked using the package tracking system 204. For example, the time of the next shipping event may be predicted by the package tracking system 204 based at least on the most recent shipping event. Then, one or more requests (e.g. API requests) for the shipping status of that package may be sent by the package tracking system 204 based on the predicted time of the next shipping event. For example, one or more API requests may be sent in a time window during which the next shipping event is predicted to occur (e.g., predicted to be likely to occur with a defined degree of confidence). The frequency of the requests may increase closer to the time at which the next shipping event is predicted to occur.

For example, assume that the e-commerce platform 100 knows that a particular package is out for delivery to a buyer having an address in New York City. The shipping status of the package obtained from the last API call to the carrier's API indicated that the package left Los Angeles at 12 PM on April 20th. The package tracking system 204 predicts that the next shipping event will be an arrival in New York City approximately 6 hours after leaving Los Angeles. Therefore, the next API call to check the shipping status for that package is not made until 5:30 PM on April 20th. After that, the API calls become more frequent for that package, possibly with increasing frequency as 6 PM approaches, e.g. an API call at 5:30 PM, 5:45 PM, 5:50 PM, and every few minutes thereafter until the shipping status has changed. In this way, API requests are not made unnecessarily, but rather are distributed close to the predicted time at which the next shipping event is predicted to occur. The frequency of the API requests may reduce again if the predicted time (or time window) passes with no change in shipping status, e.g. if the predicted time of the next shipping event was incorrect. If the predicted time or time window passes with no change in shipping status, the API request rate may default to a predefined frequency, e.g. once an hour.

Although the embodiments described herein may be implemented using package tracking system 204 in e-commerce platform 100, the embodiments are not limited to the specific e-commerce platform 100 of FIGS. 1 to 3. For example, the embodiments may be implemented using any e-commerce platform. More generally, the embodiments are not even necessarily limited to an e-commerce platform, but could be implemented in a standalone application or platform associated with a merchant's online store. Therefore, the embodiments below will be described more generally in relation to a software application used to provide shipping information to a customer.

Example System for Tracking Shipping Events

Figure 4:
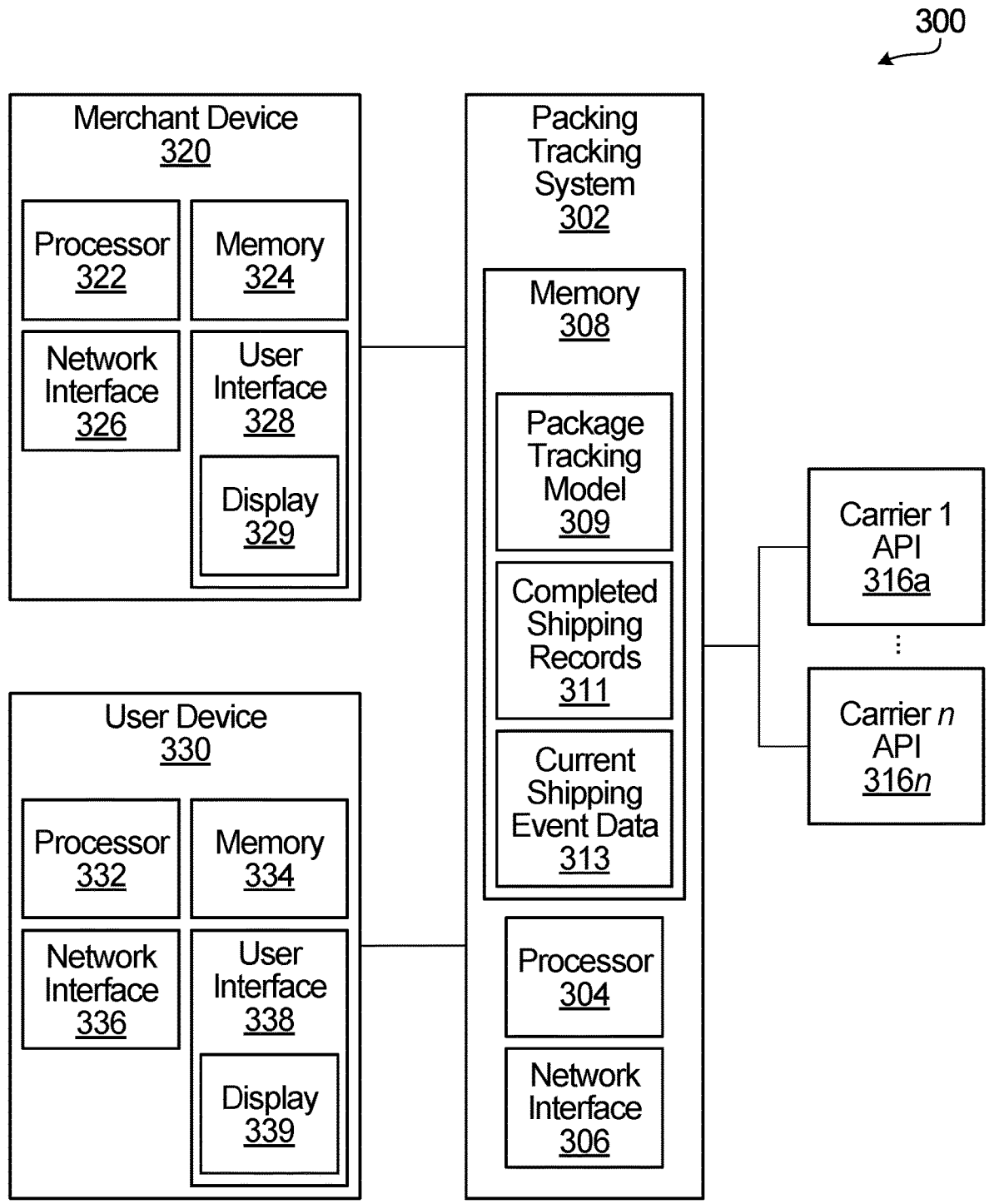
FIG. 4 illustrates a system for predicting when to send a request to a carrier API for package tracking, according to one embodiment.

FIG. 4 illustrates a system for tracking shipping events for a package and predicting when a shipping status of the package will be updated, according to one embodiment.

The system 300 includes a package tracking system 302 in communication with a merchant device 320, a user device 330, and one or more carrier APIs 316a to 316n.

The package tracking system 302 may be a part of an e-commerce platform, e.g. e-commerce platform 100. For example, the package tracking system 302 may be implemented by a processor on the e-commerce platform 100 of FIG. 3. However, this is only an example. The package tracking system 302 could also or instead be provided by another component of an e-commerce platform or implemented as a stand-alone component or service that is external to an e-commerce platform. In some embodiments, the package tracking system 302 may be provided in the form of a downloadable application that is available for installation in relation to a merchant account, or a downloadable application that is available for installation by a customer. In addition, at least a portion of the package tracking system 302 could be implemented on a merchant device and/or a user device, e.g. on merchant device 102 of FIG. 3 or on merchant device 320 described below or on customer device 150 of FIG. 3 or user device 330 described below. For example, the merchant device and/or the user device could store and run some or all of the package tracking system 302 locally as a software application.

The package tracking system 302 may include a processor 304, a network interface 306, and a memory 308. The network interface 306 is for communicating over a network. The network interface 306 may be implemented as a network interface card (NIC), and/or a computer port (e.g. a physical outlet to which a plug or cable connects), and/or a network socket, etc., depending upon the implementation. The processor 304 directly performs or instructs the package tracking system 302 to perform the operations of the package tracking system 302. The processor 304 may be implemented by one or more general purpose processors that execute instructions stored in a memory (e.g. in memory 308) or stored in another non-transitory computer-readable medium. The instructions, when executed, cause the processor 304 to directly perform, or instruct the package tracking system 302 to perform the operations described herein. In other embodiments, the processor 304 may be implemented using dedicated circuitry, such as a programmed FPGA, a GPU, or an ASIC. The memory 308 may include a package tracking model 309, completed shipping records 311, and current shipping event data 313, which will be described in more detail later.

In some embodiments, the package tracking system 302 may be implemented inside of an e-commerce platform. In some embodiments, the processor 304, memory 308, and/or network interface 306 may be located outside of the package tracking system 302.

The package tracking system 302 communicates over the network with a plurality of carrier APIs, such as Carrier 1 API 316a to Carrier n API 316n. Carrier 1 API 316a to Carrier n API 316n are the APIs belonging to respective carriers used by one or more merchants to ship their packages to customers. The package tracking system 302 may make requests to the carrier APIs when the package tracking system 302 predicts that a shipping event may occur, as described in more detail later.

A plurality of merchants may access the package tracking system 302 over a network using merchant devices, e.g. to track one or more packages. For ease of explanation, only a single merchant device 320 is illustrated in FIG. 4. The merchant device 320 includes a processor 322, a memory 324, a user interface 328, and a network interface 326. The processor 322 directly performs, or instructs the merchant device 320 to perform, the operations of the merchant device 320 described herein, e.g. changing the status of a customer's order to "fulfilled", through the use of user interface 328, to indicate that a tracking identifier has been created and that the package tracking system 302 may begin to predict changes in shipping status. The processor 322 may be implemented by one or more general purpose processors that execute instructions stored in a memory (e.g. memory 324) or stored in another non-transitory computer-readable medium. The instructions, when executed, cause the processor 322 to directly perform, or instruct the merchant device 320 to perform, the operations described herein. In other embodiments, the processor 322 may be implemented using dedicated circuitry, such as a programmed FPGA, a GPU, or an ASIC. The user interface 328 may be implemented as a display screen (which may be a touch screen), and/or a keyboard, and/or a mouse, etc., depending upon the implementation. The network interface 326 is for communicating with the package tracking system 302 over the network. The structure of the network interface 326 will depend on how the merchant device 320 interfaces with the network. For example, if the merchant device 320 is a mobile phone or tablet, the network interface 326 may comprise a transmitter/receiver with an antenna to send and receive wireless transmissions to/from the network. If the merchant device 320 is a personal computer connected to the network with a network cable, the network interface 326 may comprise a MC, and/or a computer port (e.g. a physical outlet to which a plug or cable connects), and/or a network socket, etc.

A plurality of users may access the package tracking system 302 over a network using user devices, e.g. to receive tracking updates related to packages being shipped to them. For ease of explanation, only a single user device 330 is illustrated in FIG. 4. The user device 330 includes a processor 332, a memory 334, a user interface 338, and a network interface 336. The processor 332 directly performs, or instructs the user device 330 to perform, the operations of the user device 330 described herein, e.g. receiving and presenting notifications that indicate that the shipping status of a package has changed for a package carrying a product that the customer has ordered from a merchant's online store. The processor 332 may be implemented by one or more general purpose processors that execute instructions stored in a memory (e.g. memory 334) or stored in another non-transitory computer-readable medium. The instructions, when executed, cause the processor 332 to directly perform, or instruct the user device 330 to perform, the operations described herein. In other embodiments, the processor 332 may be implemented using dedicated circuitry, such as a programmed FPGA, a GPU, or an ASIC.

The user interface 338 may be implemented as a display screen (which may be a touch screen), and/or a keyboard, and/or a mouse, etc., depending upon the implementation. The network interface 336 is for communicating with the package tracking system 302 over the network. The structure of the network interface 336 will depend on how the user device 330 interfaces with the network. For example, if the user device 330 is a mobile phone or tablet, the network interface 336 may comprise a transmitter/receiver with an antenna to send and receive wireless transmissions to/from the network. If the user device 320 is a personal computer connected to the network with a network cable, the network interface 336 may comprise a NIC, and/or a computer port (e.g. a physical outlet to which a plug or cable connects), and/or a network socket, etc.

As described in more detail below, the package tracking system 302 may include a computer model stored as package tracking model 309. The model may be generated and used for predicting a change in shipping status. The model may be used to determine when to send one or more API requests to one of the carrier APIs 316a to 316n to check the shipping status of a package. The model may be updated over time as it is used and as more information is collected based on the actual shipping events and transit times.

Creation of the Model for Predicting a Change in Shipping Status

In some embodiments, a separate model may be created for each carrier by analyzing a plurality of shipping records for a large quantity of packages previously shipped and delivered by that carrier to find patterns and relationships between shipping events. Following its generation, the model may be stored as package tracking model 309 in the memory 308 of package tracking system 302.

FIG. 5 illustrates an example shipping record 400 for a package that was previously shipped by a merchant and delivered to a customer who purchased an item from the merchant's online store. The shipping record 400 is stored in memory, e.g. as one record in a collection of completed shipping records 311 in memory 308 of the package tracking system 302. The shipping record 400 stores the tracking identifier 402 and an indication of the carrier that shipped and delivered the package 404. The shipping record 400 further stores a time-ordered list of shipping events 406, a list of locations at which each corresponding shipping event occurred 408, and a list of date/time stamps 410 to indicate when the corresponding shipping event occurred. Here, the tracking identifier 402 is "1Z28W7772027341888" and the carrier 404 is UPS. An example of a shipping event 406 in the shipping record may be "Pickup", indicating that the package has been picked up from the merchant by the carrier. The location 408 of this event is recorded in memory as San Francisco, USA and the corresponding date/time stamp 410 indicates that the pickup event occurred on Apr. 20, 2020 at 10 AM.

In some embodiments, the carrier may be determined from the tracking identifier. For example, a tracking identifier may uniquely map to a particular carrier. The tracking identifier may also uniquely map to other information, such as mail class. Alternatively, the carrier may have been indicated by the merchant. For example, the merchant may have explicitly indicated the carrier of a package using the merchant device 320 in communication with the package tracking system 302. For example, the merchant may have, through the use of UI 328, indicated that package "1Z28W7772027341888" of completed shipping record 400 was shipped via the carrier UPS. In some embodiments, if the merchant uses an e-commerce platform or other application to connect with and select a carrier, then once the carrier is selected the identity of the carrier is stored as part of the shipping record 400.

Each event in a shipping record, such as in shipping record 400, is referred to as a shipping event. A large number of shipping records may be analyzed by the package tracking system 302 to generate a model that stores all known shipping routes for each carrier and the average time between shipping events. For example, the completed shipping records 311 for a particular carrier may be analyzed to generate a package tracking model 309 from those shipping records 311. From the completed shipping records 311 for the carrier, all known shipping routes and average time between shipping events may be determined and stored in the package tracking model 309.

Figure 6:
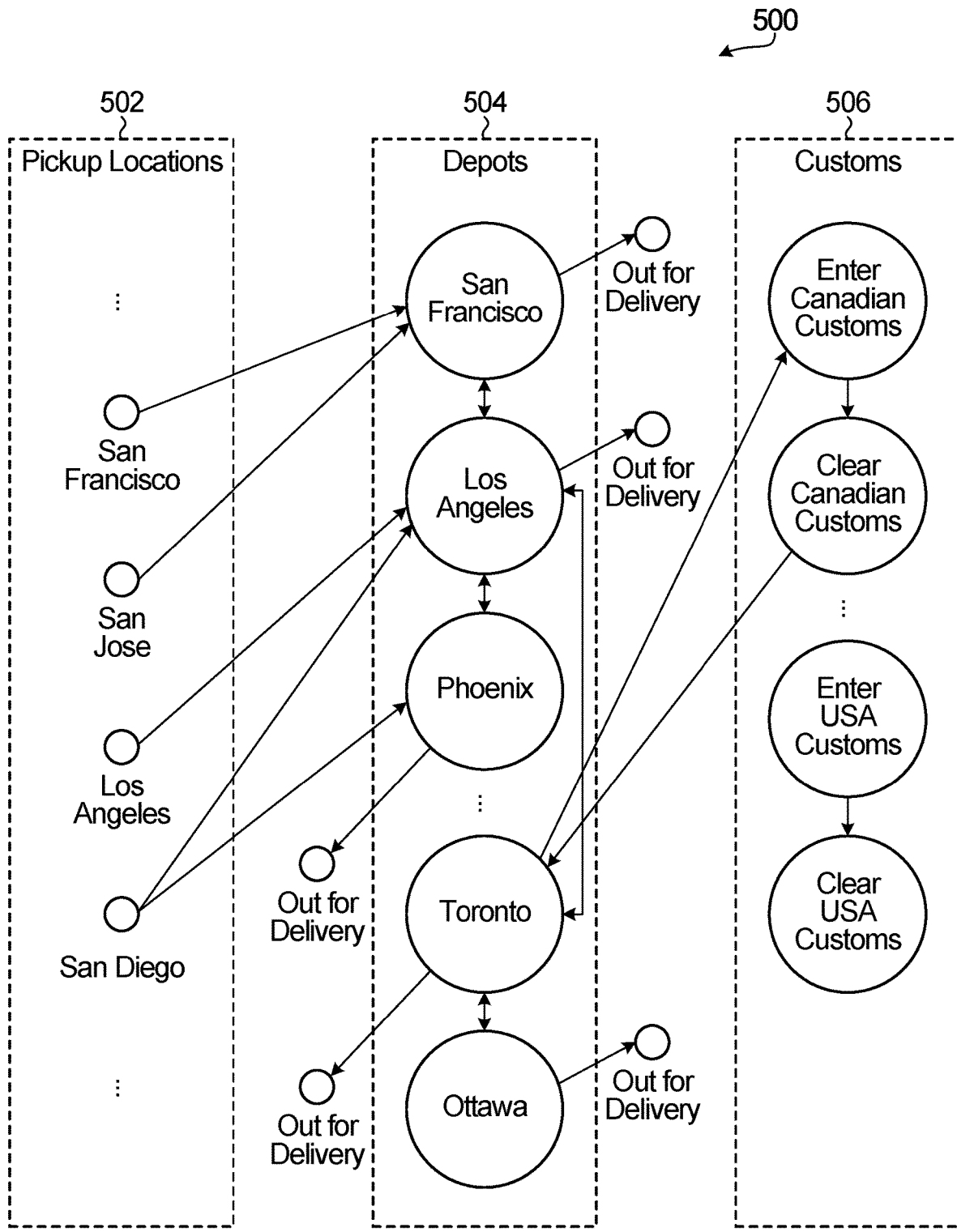

FIG. 6 illustrates an example of a package tracking model 309 for a particular carrier, in the form of a directed graph model 500, according to some implementations. Each node in the directed graph represents a shipping event, and arrows connecting various nodes indicate consecutive shipping events. The model 500 includes several nodes representing pickup locations 502 indicating the package's city of origin. Examples of pickup locations 502 include San Francisco, San Jose, Los Angeles, and San Diego. The model 500 may also include several nodes representing depots 504 where the packages are sorted and prepared for further distribution. Model 500 includes depots 504 in San Francisco, Los Angeles, Phoenix, Toronto, and Ottawa. The model 500 indicates that packages can travel between various depots 504 as consecutive shipping events. For instance, packages at the Phoenix depot might be shipped to the Los Angeles depot or vice versa. As well, packages at a depot might be sent out for delivery to the customer, e.g. if the depot is in the same city as the delivery address. Several nodes are also used to represent shipping events relating to customs 506 when packages are shipped across international borders. Examples of customs shipping events 506 include entering Canadian customs and clearing Canadian customs.

The model 500 connects two shipping events by an arrow if the events can be adjacent to each other in a shipping route. For instance, in model 500 the package can be sent directly from the Los Angeles depot to the Toronto depot, and vice versa, but not from the Phoenix depot directly to the Toronto depot. The possible routes and consecutive shipping events stored in the model 500 are determined from past shipping records, such as from completed shipping record 400 and other completed shipping records 311. For example, the completed shipping records 311 from packages previously shipped by the carrier may reveal that packages are never routed from Phoenix directly to Toronto, but instead all packages originating from the southwestern USA are routed through the Los Angeles depot to get to Toronto.

One example of a series of shipping events possible according to the directed graph model 500 is as follows. A package is picked up from a merchant in San Francisco by the carrier, who then transports the package to the San Francisco depot. The carrier then transports the package to the Los Angeles depot, and then to the Toronto depot. After arrival at the Toronto depot, the package enters Canadian customs, clears Canadian customs, and is then sent from the Toronto depot out for delivery by the carrier to a customer in the Toronto area.

Each depot 504 may have an associated average time that a package is held at the depot, which is computed from previous shipping records, such as completed shipping record 400 and other completed shipping records 311. The average holding time may vary depending on a plurality of factors that may be incorporated into the model. These factors may include the day of the week and/or time the package arrived at the depot. For instance, for a particular depot, the average holding time may be 3 hours if the package arrives at that depot before 5 μm, and the average holding time may be 12 hours if the package arrives at that depot after 5 pm. Other factors may include the location from which the package arrived, the package's final destination, the season during which the package is being shipped, and/or the shipping service level or mail class selected by the customer. For instance, if the mail class selected by the customer is "expedited shipping", the average holding time of a package at a depot may be 1 hour, whereas the average holding time of a package with a "standard shipping" mail class may be 4 hr. In another example, the average hold time may increase at a depot during a time period known to have increased shipping volumes, such as around Black Friday, Cyber Monday, or the weeks leading up to Christmas.

Similarly, each arrow in model 500 representing the transit or change between events may have an associated average time, which is computed from previous shipping records, such as completed shipping record 400 and other completed shipping records 311. The average time between two adjacent shipping events may vary depending upon different factors that may be incorporated into the model 500, which may include: day and/or time the shipping event occurred, season, pickup location, destination location, shipping service level or mail class selected by buyer, etc. For example, the average time from when the package leaves the depot in Los Angeles and arrives at the depot in Toronto may be 9.8 hours in May, but may be 14 hours in January.

In some embodiments, a model generated for a particular carrier may have different variations or variables incorporated. For instance, a package being shipped from San Diego and having a final destination of Toronto may be shipped via a different route and/or have different average times between adjacent shipping events depending on the plurality of factors incorporated into the model. Some examples of these factors may include: the selected mail class, where the average time between shipping events may be lower if expedited shipping is selected; characteristics of the package, such as the size and/or weight of the package; and/or the season during which the package is shipped, as a package shipped in the winter may take longer than a package shipped in the spring. As well, the shipping methods of a large package, such as an appliance, may be limited from air travel, which may result in slower shipping than a small package, such as a keychain. That is, the characteristics (e.g. size and/or weight) of the package may also influence the route and/or average times.

The directed graph model 500 of FIG. 6 is only an example. In actual implementation, the carrier models may be stored as tables or in an equivalent format. For example, the different variations and versions of each carrier model may be stored in memory 308 in the form of one or more tables, such as those illustrated in FIGS. 7 and 8. FIG. 7 illustrates an example of a carrier model 600 that may be stored in memory 308. The model 600 in FIG. 7 stores the duration between adjacent shipping events for a particular carrier under a particular set of conditions. The model 600 is one example of a package tracking model 309 that may be stored in the memory 308 of the package tracking system 302. The model 600 is for a particular time of year (April to June) and for a particular mail class ("standard mail"). The model 600 may be associated with other variables also, e.g. the model 600 may be specific to a certain package characteristic (e.g. a package underneath a certain weight and/or size). In some embodiments, the model 600 may be specific to a particular merchant. The model 600 includes a column indicating the carrier 602 shipping the package, such as U.S. Postal Service (USPS), Canada Post, etc. The model 600 includes columns indicating a first event, Event 1 604, and a consecutive second event, Event 2 606, as well as the average duration between the two events 608 based on a plurality of completed shipping records, such as shipping record 400 and other completed shipping records 311 in memory 308.

Model 600 in memory includes the events represented by the nodes and arrows of the directed graph model 500 in FIG. 6. In one example, a package being shipped from San Diego and having Toronto as a final destination can be traced as described in directed graph model 500 and shown in model 600 of FIG. 7, assuming standard mail class in April to June. As the package originates in San Diego, the first leg of the shipment is performed by the carrier USPS 602, in which Event 1 604 is "Pick-Up" and Event 2 606 is "Arrive at San Diego Depot", which is recorded to have an average duration of 0.8 hr. A later leg of the journey found within the model 600 may include "Depart Los Angeles Depot" as Event 1 604 and "Enter Canadian Customs" as Event 2 606 handled by USPS. A following leg of the journey may then be "Clear Canadian Customs" as Event 1 and "Arrive at Toronto Depot" as Event 2, in which Canada Post is then listed as the associated carrier 602.

Likewise, FIG. 8 illustrates another example of a model 700 storing the duration between shipping events for a particular carrier under a different set of conditions, according to some embodiments. The model 700 is another example of a package tracking model 309 that may be stored in the memory 308 of the package tracking system 302. The model 700 is for a particular mail class ("standard mail"). The model 700 may be associated with other variables also, e.g. the model 700 may be specific to a certain package characteristic (e.g. a package underneath a certain weight and/or size). In some embodiments, the model 700 may be specific to a particular merchant. The version of the model 700 illustrated in FIG. 8 reflects the average duration of time between changes in shipping statuses during a period in which a high volume of shipping is expected, such as Black Friday and Cyber Monday in North America. Like model 600, model 700 includes a column indicating the carrier 702 responsible for shipping the package. The model 700 also includes columns indicating a first event, Event 1 704, and a consecutive second event, Event 2 706, as well as the average duration between the two events 708 based on a plurality of completed shipping records, such as shipping record 400 and other completed shipping records 311 in memory 308.

As model 700 represents a period in which a high volume of packages being shipped is expected, the average duration of time between shipping events 708 are longer than the average duration of time between shipping events 608 in model 600. Particularly, the duration between arrival and departure of a package at a depot is longer, as there are more packages to be sorted at the depot. As well, the duration of time between departing a depot and delivery to the recipient may be lengthened due to an increased number of packages for a delivery worker to deliver on a particular delivery route. For example, in model 600, the duration between arrival at the Los Angeles Depot and departure from the Los Angeles depot is on average 8.5 hr. Conversely, in model 700, the average duration of the same event is 16 hr.

The carrier models described above in relation to FIGS. 6 to 8 are specific to one or more carriers, and an average time between shipping events for a particular carrier is computed from previous shipping records for packages previously shipped by that carrier. However, in other embodiments, the model may be carrier-agnostic and/or the model may incorporate previous shipping records from multiple carriers.

As well, the models illustrated in FIGS. 6 to 8 are only example implementations. In a different implementation, historical shipping records might not be used to populate the shipping events, the average duration of the shipping events, and/or the shipping routes. Instead, initial assumptions regarding the shipping data may be made by the package tracking system 302 and refined over time as packages are shipped and predictions are tested. The model may be updated as data is collected.

In a different implementation, a library of all possible shipping events may be created for a carrier, e.g. from reviewing completed shipping records 311 for that carrier. For each shipping event, an average time until the occurrence of a next shipping event may be computed without regard to the identity of the next shipping event. For example, if the current shipping event is "Departed Los Angeles Depot", the average time until a next shipping event may be determined and recorded as 6.5 hours. Thereafter, whenever the current shipping event is "Departed Los Angeles Depot", 6.5 hours may be used as the predicted time until a change in shipping status, regardless of whether the next shipping event is sending the package out for delivery, arriving at the San Diego depot, or arriving at the Toronto depot.

According to another implementation, a machine learning algorithm may be implemented by the package tracking system 302 to generate a model. The machine learning algorithm may be trained using the shipping records of products that have already been shipped and delivered, such as completed shipping records 311 in the memory 308, in order to learn the relationships and patterns between shipping events. New shipping data, such as current shipping data 313 in memory 308, may be input into the trained machine learning algorithm to generate an output that predicts the next shipping event and/or that predicts the time to the next shipping event.

Use of the Model

In some embodiments, for each package, the package tracking system 302 uses the current shipping event and the package tracking model 309 in memory 308 to predict the time of the next shipping event.

Figure 9:
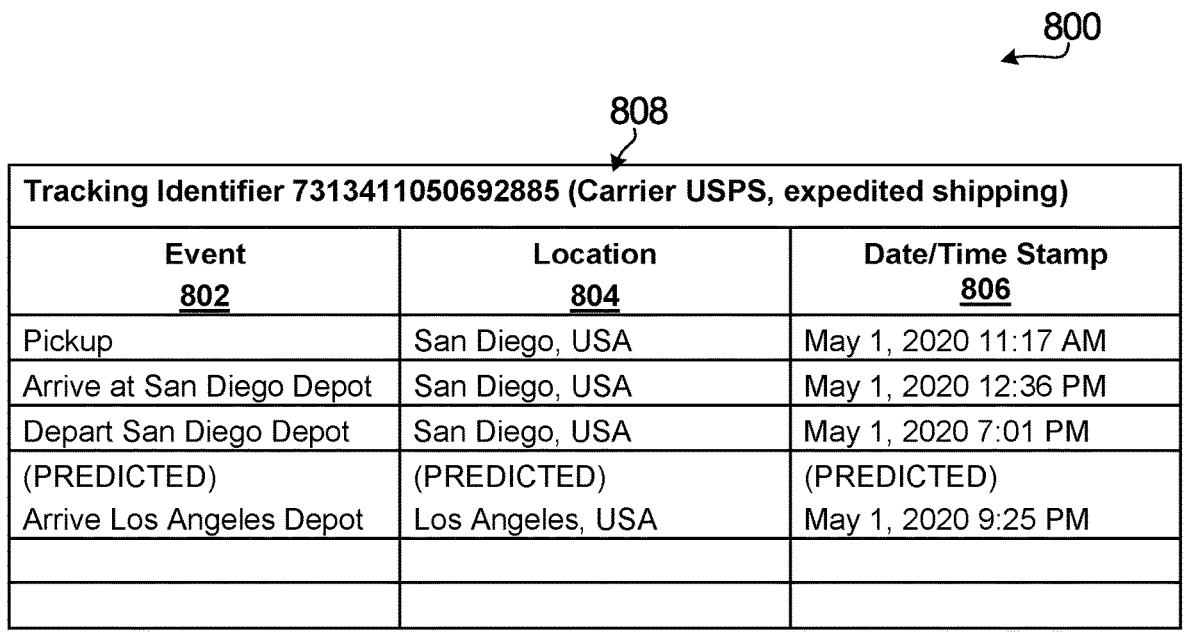
FIG. 9 illustrates an example of an incomplete shipping record.

FIG. 9 illustrates an incomplete shipping record 800, which may be an example of current shipping event data 313 stored in the memory 308 of package tracking system 302. The incomplete shipping record 800 is "incomplete" because the package has not yet been delivered, i.e. it is in transit. The incomplete shipping record 800 may store a tracking identifier and the carrier and mail class, as shown at 808. It may also store a list of shipping events that have already occurred 802, the location where they occurred 804, and the date/time stamp associated with the event 806. For example, the shipping record 800 is used to track a package with the identifier "7313411050692885", which is an expedited package handled by USPS. The record indicates that the first shipping event relating to the package was picked up in San Diego, USA at 11:17 AM on May 1, 2020.

A package tracking model 309 for the carrier may use the data from the incomplete shipping record 800 in order to predict the next shipping event for the package associated with that shipping record 800. In the case of the example record presented in FIG. 9, the package has departed the San Diego depot. Using the package tracking model 309, the package tracking system 302 predicts that the next shipping event will be arrival of the package at the Los Angeles depot. This prediction is based on the fact that the final destination (delivery address) of the package is Toronto, and according to the package tracking model 309 packages from the south western USA are routed through Los Angeles for shipment to Toronto, e.g. as shown in the example package tracking models 500, 600, and 700 of FIGS. 6 to 8. In the example in FIG. 9, the model predicts that the package will arrive at the Los Angeles depot 2.4 hr after departing the San Diego depot on average, in which case the predicted day/time of arrival is 9:25 PM on May 1, 2020 (i.e. 2 hours and 24 minutes after the package departed the San Diego depot). As a result, in some embodiments the package tracking system 302 does not send an API call to the USPS carrier API until closer to the expected arrival time of 9:25 PM on May 1, 2020. In some implementations, the frequency at which API requests are sent to the carrier API may increase in a time window around 9:25 PM until a shipping update has been obtained. The updated shipping status may then be transmitted from the package tracking system 302 to the user device 330 for presentation to the customer. If the predicted time or time window passes with no change in shipping status, the API request rate may default to a predefined frequency, such as one request per hour.

Figure 10:
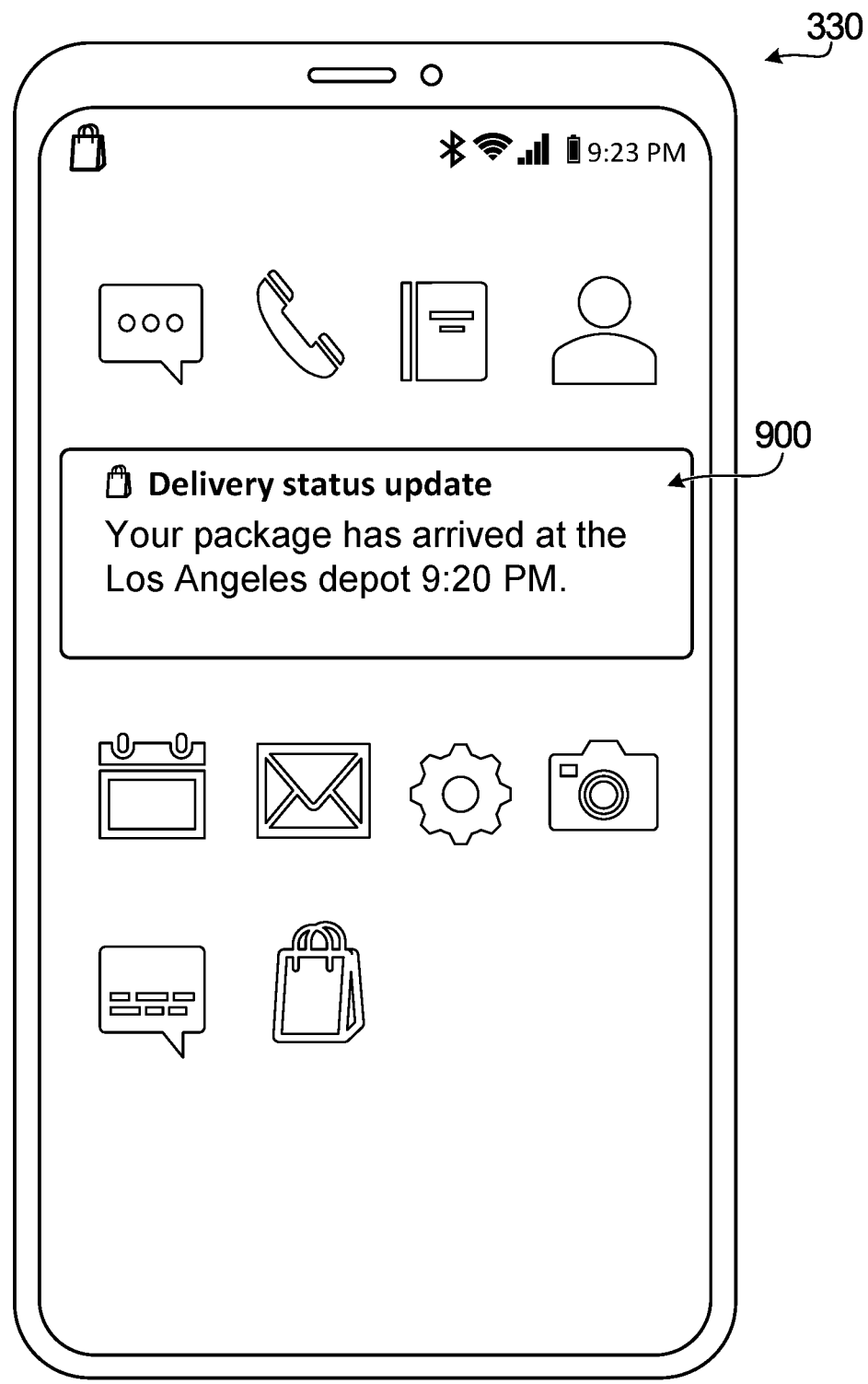
FIG. 10 illustrates an example user interface, including a push notification that indicates that a shipping event has occurred.

FIG. 10 illustrates an example message 900 provided by the package tracking system 302 to the user device 330 for display on the user interface 338 of the user device 330. The message indicates that an update to the shipping status of a package has occurred. A software application on user device 330 may provide push notifications, such as message 900, based on an indication from the package tracking system 302 that a change in shipping status has occurred. In the illustrated example, the package tracking system 302 sent API requests beginning closer to the predicted arrival time of 9:25 PM, and with increasing frequency as the predicted arrival time of 9:25 PM approaches. The API request sent at or shortly after 9:20 PM returns a shipping update: the package arrived at the Los Angeles depot at 9:20 PM, which was 5 minutes sooner than the predicted time of 9:25 PM. The update is immediately pushed to the user device for display as message 900 of FIG. 10.

For some shipping events, there may be multiple possible next shipping events. For instance, the directed graph model 500 of FIG. 6 illustrates that a package departing the depot in Los Angeles may be sent next to the Toronto depot, or to the San Francisco depot, or to the Phoenix depot, or sent out for delivery in Los Angeles. The package tracking system 302 may accommodate the multiple routes in different ways, depending upon the implementation.

In some embodiments, the delivery address of the package, known to the package tracking system 302, may be used to predict the next shipping event and thereby predict the time the next shipping event will occur. For example, if the package is being held in the depot in Los Angeles and the buyer's delivery address is in Eastern Canada, then the next shipping event predicted by the package tracking system 302 is sending the package to Toronto.

In some embodiments, the frequency of the API calls may increase around the predicted time of each possible next shipping event. For example, if a package is picked up in San Diego it might not be known whether the next shipping event will be arrival at the Los Angeles depot or arrival at the Phoenix depot. If arrival at the Los Angeles depot would occur around 12:30 PM and if arrival at the Phoenix depot would occur around 3 PM, then a series of API calls may be made at a high frequency around 12:30 PM, and if no shipping update was obtained then another series of API calls may be made at high frequency around 3 PM.

In some embodiments, the predicted time of the next shipping event may be a weighted average of the average times for each possible next shipping event. For example, if a package at the Phoenix depot is ultimately destined for delivery in New York, and the next stop enroute is predicted to be either the Los Angeles depot or the Las Vegas depot, then the predicted time to the next delivery event may an average of: (i) the average time from the Phoenix depot to the Los Angeles depot, and (ii) the average time from the Phoenix depot to the Las Vegas depot. A time window around the predicted time may be established within which the frequency of the API calls increase.

Predicting a Switching of a Carrier

A package may change carrier while enroute to its final destination. Particularly, this may occur if a package is shipped across international borders. For example, a package shipped from Los Angeles to Ottawa, Canada may be picked up by USPS in Los Angeles and shipped to Toronto, Canada by USPS. Then, once Canadian customs are cleared in Toronto, Canada Post may complete shipping of the package to Ottawa.

Typically, the product tracking system 302 will make API calls to the initial carrier, for example Carrier 1 API 316a, to track the package from its location of origin to its final destination. Most often, any subsequent carrier that handles the package will provide updates to the original carrier. In the example above, Canada Post would typically use the exact same tracking identifier as originally assigned by USPS, and USPS would obtain and store shipping status updates from Canada Post, such that API calls to USPS may be used to track the package from pickup to end delivery.

However, if the package tracking system 302 determines that the package's carrier may have changed, the package tracking system 302 may instead use the tracking identifier to send an API call directly to the predicted new carrier, such as Carrier n API 316n, in order to possibly obtain the shipping update sooner. Therefore, in some embodiments, the package tracking system 302 predicts whether there has been a change in carrier, and if a change in carrier is predicted, the package tracking system 302 tries sending an API call to the predicted new carrier, for example Carrier n API 316n, with the original tracking identifier. If a response is received indicating that the new carrier recognizes the tracking identifier, then API calls are made to new carrier, Carrier n API 316n, for all subsequent API calls.

A change in carrier may be predicted based on events that are indicative of changes in carriers, such as the package entering a new country and clearing customs. For example, if the initial carrier only operates domestically (e.g. USPS) and the package enters a new country and clears customs, then the carrier is predicted to have changed. The identity of the new carrier may be predicted based on previous carriers that the merchant and/or initial carrier have used in the past when transporting the package in the new country.

As another example, a change in carrier may occur for last-mile delivery, in which a local delivery service may take over the last leg of the delivery journey (particularly for expedited deliveries).

Predicting a Shipping Delay

In some embodiments, the package tracking system 302 may be able to predict a shipping delay. For example, the package tracking system 302 may be able to use package tracking model 309 in conjunction with the current shipping data 313 relating to a package to predict if the package will reach the customer within an expected time window. For example, if the customer purchased expedited shipping, it is expected that the customer will receive their package in three to five business days.

The package tracking system 302 may predict the occurrence of a next shipping event based on the current shipping status and using the package tracking model 309. For instance, if the most recent shipping event recorded for a package is "Arrive at Los Angeles Depot" at 2:50 PM on May 7, the next predicted shipping event may be "Depart Los Angeles Depot" at 11:20 PM on May 7, i.e. 8.5 hr later (which is the average time shown in model 600 of FIG. 7). If it is well beyond the predicted time of the next shipping event (e.g. 24 hours after the time of arrival at the Los Angeles depot), and if the shipping status has still not yet been updated, then the package tracking system 302 may determine that the package will be delayed. After a substantially large time has elapsed following the expected occurrence of a shipping event, the system may reasonably conclude that the package will not arrive when expected. Subsequently, depending on the time elapsed during the previous shipping events and a model-based estimate for the time expected to complete the remainder of the package's journey, the package tracking system 302 may predict that the package may arrive at its final destination outside of the expected time-window. For instance, if the package was expected to be delivered to a customer in Toronto on May 8, but the package has yet to leave the Los Angeles Depot by 2:50 PM on May 8, the package tracking system 302 will predict that the package will not arrive on time.

Likewise, or instead, the package tracking system 302 may predict that a package will be delayed if an unpredicted shipping event is returned when the system makes a call to a carrier API, such as one of Carrier APIs 316a to 316n. This might include the package tracking system 302 receiving an indication for a shipping event that is not expected to occur subsequent to the last recorded shipping event for a shipping route of a package with a specified destination. As an example, a package originating from Los Angeles with a final destination of Toronto is expected to ship directly from the depot in Los Angeles to the depot in Toronto, according to models 500, 600, and 700 of FIGS. 6 to 8. If an API call to the carrier returns the shipping status "Arrival at Phoenix Depot" when the last shipping event in the package tracking record 313 is "Departed Los Angeles Depot", the package tracking system 302 may predict that the package will be delayed, as the directed graph model of 500 does not indicate that a package in Los Angeles and enroute to Toronto will pass through Phoenix. The package tracking system 302 may determine that the package has been misrouted or an unforeseen circumstance has resulted in the use of a new shipping route, which may result in a lengthened duration of transit.

Figure 11:
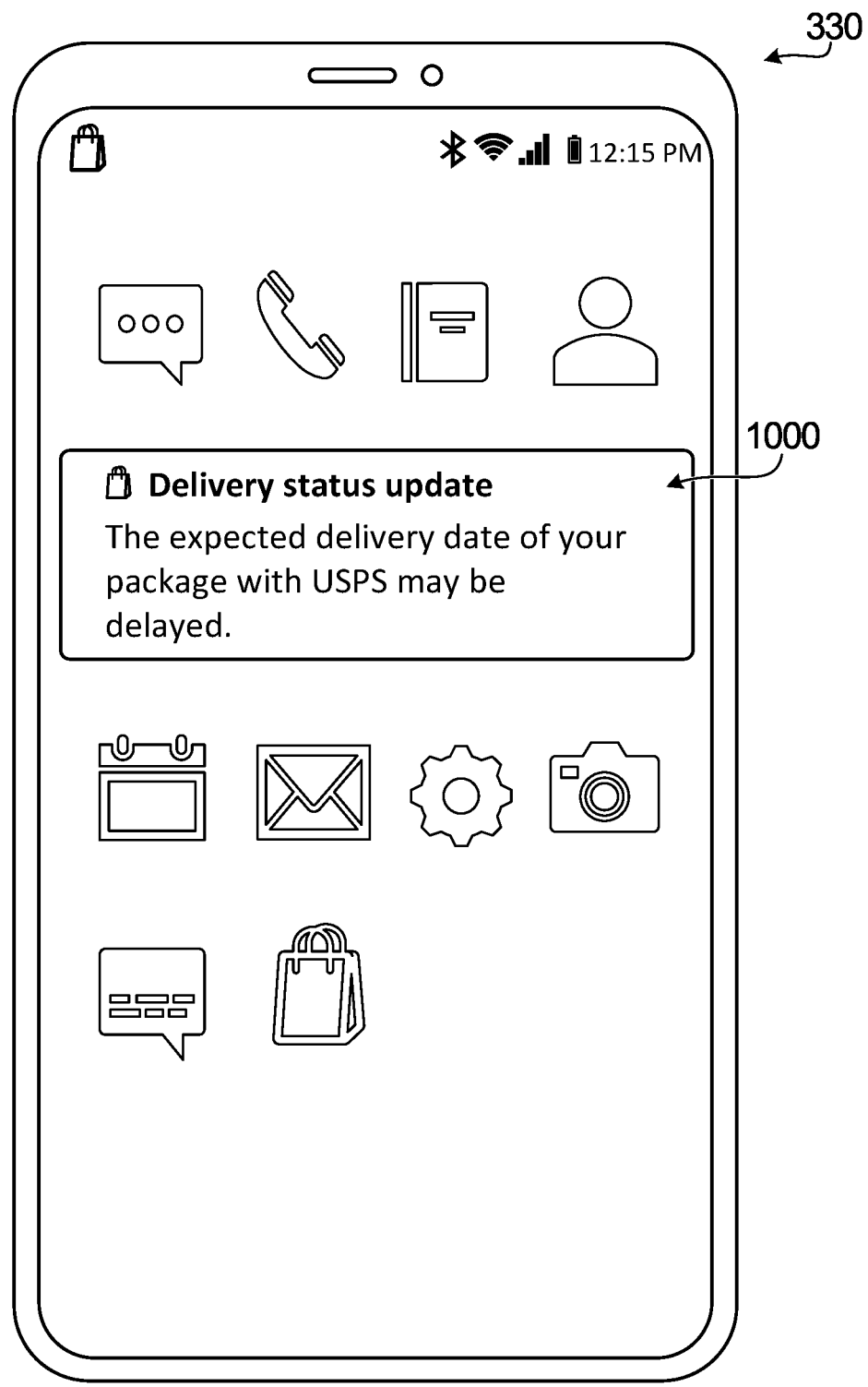
FIG. 11 illustrates an example of the user interface of FIG. 10, but the push notification indicating that the customer's package will be delayed.

FIG. 11 illustrates an example message 1000 provided by the package tracking system 302 to the user device 330 for display on the user interface 338 of the user device 330. A software application on user device 330 may provide push notifications, such as message 1000, indicating that a package is predicted to reach the customer at its final destination later than anticipated. The package tracking system 302 may have used the package tracking model 309 within the memory 308 to determine whether a delay in shipping has occurred that will result in a change to the package's expected delivery date. For example, if the package tracking system 302 polls Carrier 1 API 316a and receives an indication that a Toronto-bound package has arrived at the Phoenix depot, the package tracking system 302 may issue push notification 1000 for display on the display 339 of user interface 338 on the user device 330 to notify the customer that "The expected delivery date of your package with USPS may be delayed".

Example Methods

Figure 12:
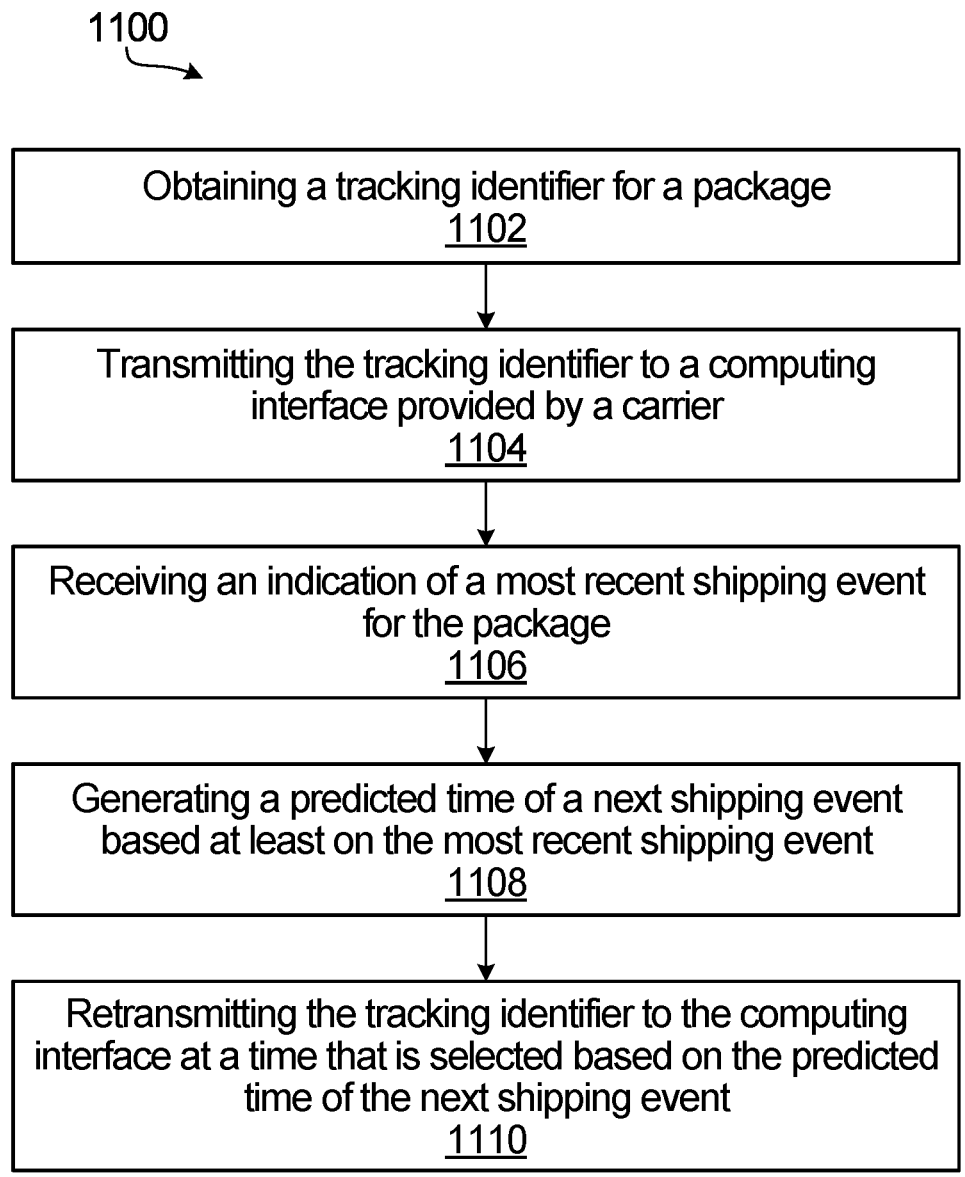
FIG. 12 illustrates steps of a computer-implemented method, according to one embodiment.

FIG. 12 illustrates a computer-implemented method 1100, according to one embodiment. The method may be performed by a computing device associated with a package tracking system (e.g. a processor or combination of processors such as the processor 304 in package tracking system 302). The method will be described as being performed in package tracking system 302 of FIG. 4, but this is not necessary. For example, the method may be performed by another entity.

At step 1102 of FIG. 12, the processor 304 of the package tracking system 302 obtains a tracking identifier for a package. For example, in the example described in relation to FIG. 9, the package tracking system 302 obtains tracking identifier "7313411050692885" associated with incomplete shipping record 800. In FIG. 9, the tracking identifier is used to identify a package handled by USPS with a location of origin in San Diego, USA. The incomplete shipping record 800 may be one record stored within current shipping event data 313 within memory 308 of the package tracking system 302.

At step 1104, the tracking identifier is transmitted to a computing interface provided by a shipper. An example of a computing interface is a carrier API. For example, the package tracking system 302 transmits the tracking identifier associated with incomplete shipping record 800, to a computing interface, such as one of a plurality of carrier APIs 316a to 316n. In the specific example in relation to FIG. 9, the tracking identifier "7313411050692885" is transmitted to the API associated with the carrier USPS, which may be Carrier 1 API 316a of system 300.

Then, at step 1106 of method 1100, an indication is received of a most recent shipping event for the package. For example, for incomplete shipping record 800 of FIG. 9, the carrier API associated with the carrier USPS may return an indication of the most recent shipping event: Depart San Diego Depot, location San Diego, Date/Time May 1, 2020 7:01 PM.

At step 1108, a predicted time of a next shipping event is generated for the package based at least on the most recent shipping event. In some embodiments, the package tracking system 302 uses the latest event data in the current shipping event data 313 stored in memory 308 as an input to the package tracking model, such as model 309, or models 500, 600, or 700 of FIGS. 6, 7, and 8 respectively. For example, based on the shipping characteristics (e.g. mail class, time of year, etc.) of the package identified by tracking identifier "7313411050692885" in FIG. 9, model 600 of FIG. 7 may be used to predict the next event and at which time it will occur, as the package of FIG. 9 is of standard mail class and shipped between the months of April and June. Based on the fact that the most recent shipping event is departing San Diego depot, model 600 would input this event as Event 1 604 and predict that the arrival of the package at the Los Angeles depot to be Event 2 606. According to model 600, the average duration between these two events is 2.4 hours. Therefore, since the date/time stamp of the last event of incomplete shipping record 800 is May 1, 2020 7:01 PM, the model is used to predict the arrival of Los Angeles depot at May 1, 2020 9:25 PM.

Lastly, at step 1110 of method 1100, the tracking identifier is retransmitted to the computing interface at a time that is selected based on the predicted time of the next shipping event. For instance, if, for the incomplete shipping record 800, the next predicted event is the arrival of the package at the Los Angeles depot at 9:25 PM, the package tracking system 302 might not begin retransmitting the tracking identifier "7313411050692885" to the API associated with the carrier until a predetermined time in advance of, but relatively close to, 9:25 PM. For example, the next API call may be at 9 PM. By delaying the next API call to closer to the predicted time of 9:25 PM, computer resources and API calls are reduced compared to if API calls were made continually right from 7:01 PM onwards.

In some embodiments of the method of FIG. 12, it is determined whether a next shipping event has occurred based on a response from retransmitting the tracking identifier, and, when the next shipping event has occurred, the package tracking system 302 transmits an indication of the next shipping event to a device associated with a recipient of the package. An example of such an indication is message 900 in FIG. 10.

Conversely, in some embodiments, if the next shipping event has not yet occurred, the tracking identifier is retransmitted to the computer interface again at a subsequent time closer to the predicted time of the next shipping event. If, for example, a request was sent to Carrier 1 API 316a associated with the carrier USPS at 9:20 PM for the tracking identifier "7313411050692885" of incomplete shipping record 800, the package tracking system 302 may determine whether the next predicted shipping event "Arrive at Los Angeles Depot" has occurred based on the response from Carrier API 316a. When the package tracking system 302 determines that the package has arrived at the Los Angeles depot, in some embodiments the package tracking system 302 transmits an indication that this event has occurred to user device 330, which may be displayed to the customer via the display 339 of user interface 338. An example is shown in FIG. 10.

However, if the predicted next shipping event "Arrive at Los Angeles Depot" associated with tracking identifier "7313411050692885" has not been determined to occur following the API request sent at 9:20 PM, tracking identifier 808 may be retransmitted to USPS Carrier API 316a two minutes later, even closer to the predicted event time of 9:25 PM.

In some embodiments, when the next shipping event has not occurred, the tracking identifier is retransmitted to the computing interface a plurality of times, until a response is received indicating that the next shipping event has occurred. Optionally, in some embodiments, the retransmitting may occur with increasing frequency closer to the predicted time of the next shipping event. For example, if the package associated with tracking identifier "7313411050692885" was determined not to have arrived yet at the Los Angeles depot in response to the API call sent at 9 PM, then the package tracking system 302 may retransmit the tracking identifier to the API call at 9:05 PM. If the response from the carrier API indicates that the next shipping event (arrival at the Los Angeles depot) has still not occurred, the tracking identifier may be transmitted to carrier API again with decreasing time between requests. For example, the next API request may be sent three minutes later at 9:08 PM, followed by another request two minutes later 9:10 PM, then once per minute until the next shipping event occurs, or until a time window has expired (e.g. the predicted time of 9:25 PM has already passed).

In some embodiments, beginning at a particular point in time at or subsequent to the predicted time of the next shipping event: when a response is not yet received indicating that the next shipping event has occurred, the tracking identifier may be retransmitted with less frequency than the frequency at which the tracking identifier was retransmitted leading up to the predicted time of the next shipping event. For example, if at 9:26 PM, the package tracking system 302 has determined that a next shipping event (predicted to be arrival at the Los Angeles depot) has still not occurred, the package tracking system 302 may begin to reduce the time between API requests to the carrier API 316a associated with the carrier USPS. For example, the package tracking system may send the tracking identifier to carrier API 316a two minutes later at 9:18 PM, then further increase the time between API requests to five minutes, and possibly eventually to a steady state, e.g. one API request per hour.

In some embodiments, when the next shipping event has occurred, the next shipping event is set to the most recent shipping event, and the generating and the retransmitting steps (i.e. steps 1108 and 1110) are reperformed. For instance, if the package tracking system 302 determines that the next event "Arrive at Los Angeles Depot" has occurred, this shipping event is set to the most recent shipping event. Steps 1108 and 1110 of method 1100 are then performed again, in which the predicted time of the subsequent shipping event following the arrival of the package at the Los Angeles Depot is determined. The next shipping event may be predicted to be "Depart Los Angeles Depot", which is predicted to occur 8.5 hours later according to model 600. Based on the time that the package arrived at the Los Angeles Depot, e.g. 9:20 PM, the time at which the tracking identifier is again retransmitted to carrier API 316a may be prior to but near the next predicted time of 5:50 AM (i.e. 8.5 hours after 9:20 PM).

In some embodiments, generating the predicted time of the next shipping event may include predicting an identity of the next shipping event based on the most recent shipping event in order to obtain a predicted next shipping event and generating the predicted time based on a time at which the most recent shipping event occurred and the predicted next shipping event. Predicting the identity of the next shipping event means predicting what the next shipping event will be, e.g. "Arrive at Los Angeles Depot". For example, for incomplete shipping record 800, the package tracking system 302 generates the predicted time of the next shipping event following "Depart San Diego Depot" as follows. The package tracking system 302 first predicts the identity of the next shipping event based on the most recent shipping event of "Depart San Diego Depot". The next event is predicted to be "Arrive at Los Angeles Depot", e.g. based on the delivery address of the package being in Toronto and the fact that the package tracking model shows that packages sent to Toronto from south western USA are routed through Los Angeles. The package tracking system 302 then predicts the time at which this next event occurs (9:25 PM), e.g. based on the time of the most recent shipping event and the average time to the predicted next shipping event.

In some embodiments, the predicted next shipping event is obtained by predicting the identity of the next shipping event based on: the carrier and/or the most recent shipping event and/or a delivery address of the package. For example, the next shipping event of the package associated with incomplete shipping record 800 may be predicted based on data within the model, such as model 500, 600 and 700, specific to the carrier "USPS", the most recent shipping event to have occurred ("Depart San Diego Depot"), and the delivery address of the package ("Toronto"). The directed graph of model 500 shows the expected consecutive shipping events through the use of arrows between nodes, and illustrates expected routes that a package may take to reach its final destination. For instance, the package travelling from southern California to Toronto is (according to the model) to route through Los Angeles, and is likely not to stop between Los Angeles and Toronto in an intermediary depot.

In some embodiments, generating the predicted time may include determining the predicted time based on a previously computed average time between the most recent shipping event and the predicted shipping event. For instance, the next shipping event of the package associated with incomplete shipping record 800 may be predicted to be "Arrive at Los Angeles Depot". Package tracking model 600 of FIG. 7 indicates that for the specific set of shipping conditions related to this package, an average time of 2.4 hours elapses between departing San Diego depot and arriving at the Los Angeles depot. Therefore, the predicted time of the next shipping event may be 2.4 hours after departing the San Diego depot.

In some embodiments, generating the predicted time comprises adding the average time to the time at which the most recent shipping event occurred to result in the predicted time. For example, generating the predicted time of the arrival at the Los Angeles depot for the package associated with the incomplete shipping record 800 may include adding the average 2.4 hour duration between departure from the San Diego depot to arrival at the Los Angeles depot to the time at which the package actually departed the San Diego depot. For example, the average time of 2.4 hours is added to 7:01 PM to result in 9:25 PM as the predicted time of the next shipping event.

In some embodiments, the method may include updating the average time upon determining an actual time between the most recent shipping event and the predicted next shipping event. For instance, if the package tracking system 302 determined that the package associated with the incomplete shipping record 800 actually arrived at the Los Angeles depot at 9:20 PM (instead of the predicted time of 9:25 PM), the average duration between the shipping events "Depart San Diego Depot" and "Arrive at Los Angeles Depot" in the model 600 may be updated reduce the average duration.

In some embodiments, the computer interface may be a first computing interface and the carrier is a first carrier. The method may include: receiving an indication that the next shipping event has occurred in response to retransmitting the tracking identifier to the first computing interface; predicting, based at least on an identity of the next shipping event, that the first carrier has changed or will change to a second carrier; and, subsequently transmitting the tracking identifier to a second computing interface of the second carrier instead of to the first computing interface of the first carrier. For example, the package associated with incomplete shipping record 800 may initially be handled by the carrier USPS, which may be associated with carrier API 316a of system 300 in FIG. 4. The package tracking system 302 may receive an indication that the package has departed the Los Angeles Depot and cleared Canadian customs after API requests with the tracking identifier were sent to the carrier API 316a associated with the carrier USPS. Following custom clearance, a model 309 in memory 308, such as models 500, 600, and 700, may predict that the next shipping event will be "Arrive at Toronto Depot". Based on this predicted shipping event, the model may predict that the carrier of the package may switch from USPS to Canada Post. Following this prediction, the package tracking system 302 may send the tracking identifier 808 to carrier API 316n associated with the carrier Canada Post when issuing future API requests.

In some embodiments, method 1100 may also include receiving an indication that the next shipping event has occurred in response to retransmitting the tracking identifier to the computing interface. The indication that the next shipping event has occurred may include the time at which the next shipping event occurred. Method 1100 may further include comparing the time at which the next shipping event occurred to the predicted time, and transmitting an indication that delivery of the package may or will be delayed to a device associated with a recipient of the package if the time at which the next shipping event occurred exceeds the predicted time by a particular amount. For example, if the package tracking system 302 receives an indication from a carrier API 316a associated with USPS that the package associated with incomplete shipping record 800 has departed the Los Angeles Depot at 2:00 PM on May 3, 2020, the package tracking system 302 may determine that the package will be delayed since it was predicted to depart the depot at 1:15 AM on May 3, 2020. The package tracking system 302 may send an indication to the display 339 of the user interface 338 of user device 330, that the package will be late. An example of an indication received by a package recipient is illustrated as push notification message 1000 on the user device 330 in FIG. 11.

In some embodiments, method 1100 may also or instead include receiving an indication that the next shipping event has occurred in response to retransmitting the tracking identifier to the computing interface and comparing the next shipping event to the predicted shipping event. As well, method 1100 may include, in response to the next shipping event not being equal to the predicted next shipping event, transmitting, to a device associated with a recipient of the package, an indication that delivery of the package may or will be delayed. For example, the package tracking system 302 receives an indication that the package associated with a tracking identifier has arrived at the Phoenix depot. However, the next expected shipping event according to a model 309 in memory 308, such as model 500, 600, or 700, should have been the arrival of the package at the Toronto depot. As the shipping event data received by the package tracking system 302 from the carrier API 316a associated with the carrier USPS is not equal to the predicted shipping event, an indication that the package's delivery may be late is provided to the customer via display 339 of the user interface 338 of the customer's user device 330. An example of such an indication is push notification message 1000 in FIG. 11.

Note that the embodiments relating to determining that delivery of the package may or will be delayed can operate independently of the embodiments related to sending an API request based on a predicted time of a next shipping event. For example, the frequency of the API requests to the carrier might not be based on the predicted next shipping event or the predicted time of the next shipping event, yet the predicted next shipping event and/or the predicted time of the next shipping event may be compared to the actual next shipping event and/or the time of the actual next shipping event in order to determine whether delivery of the package may be delayed.

In some embodiments, a system is provided for performing the methods described above. The system may include a memory (e.g. memory 308) to store a tracking identifier for a package. The system may further include at least one processor (e.g. processor 304) to perform operations such as instructing transmission of the tracking identifier to the computing interface, generating a predicted time of a next shipping event, and instructing retransmission of the tracking identifier to the computing interface (e.g. at a time that is selected based on the predicted time of the next shipping event). In some embodiments, the at least one processor instructs transmission (or retransmission) of the tracking identifier to the computing interface by retrieving the tracking identifier from memory, incorporating the tracking identifier into a message, and sending the message to a network interface (e.g. network interface 306) for transmission to the carrier API. In some embodiments, a computer-readable medium is provided having stored thereon computer-executable instructions that, when executed by at least one processor, cause the at least one processor to perform method steps described above.

CONCLUSION

Although the present invention has been described with reference to specific features and embodiments thereof, various modifications and combinations may be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions, and alterations may be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor-readable storage medium or media for storage of information, such as computer/processor-readable instructions, data structures, program modules, and/or other data. A non-exhaustive list of examples of non-transitory computer/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor-readable storage media.

The invention claimed is:

1. A computer-implemented method comprising:
obtaining a tracking identifier for a package;
transmitting the tracking identifier to an application programming interface (API) provided by a carrier, the API having a limit on how many API requests can be made by the computer, the transmitting occurring at a first frequency, and in response, receiving from the API an indication of a most recent shipping event for the package;
generating a predicted time of a next shipping event for the package, the predicted time generated based at least on the most recent shipping event;
establishing a time window within which the predicted time of the next shipping event falls; and
within the time window, retransmitting the tracking identifier to the API a plurality of times, the retransmitting occurring with increased frequency compared with the first frequency closer to the predicted time of the next shipping event,
wherein beginning at a particular point in time at or subsequent to the predicted time of the next shipping event:
when a response is not yet received from the API indicating that the next shipping event has occurred, the retransmitting the tracking identifier to the API the plurality of times comprises: retransmitting the tracking identifier with less frequency than the frequency at which the tracking identifier was retransmitted leading up to the predicted time of the next shipping event.

2. The computer-implemented method of claim 1, further comprising:
based on a response from retransmitting the tracking identifier, determining that the next shipping event has not occurred; and
responsive to determining that the next shipping event has not occurred, retransmitting the tracking identifier to the API again at a subsequent time closer to the predicted time of the next shipping event.

3. The computer-implemented method of claim 1, wherein:
retransmitting the tracking identifier to the API the plurality of times comprises retransmitting the tracking identifier with the increased frequency until a response is received indicating that the next shipping event has occurred.

4. The computer-implemented method of claim 1, further comprising:
based on a response from retransmitting the tracking identifier, determining that the next shipping event has occurred; and
responsive to determining that the next shipping event has occurred, transmitting an indication of the next shipping event to a device associated with a recipient of the package.

5. The computer-implemented method of claim 4, further comprising setting the next shipping event as the most recent shipping event, and reperforming the generating and the retransmitting steps.

6. The computer-implemented method of claim 1, wherein generating the predicted time of the next shipping event comprises:
predicting an identity of the next shipping event based on the most recent shipping event in order to obtain a predicted next shipping event; and
generating the predicted time based on a time at which the most recent shipping event occurred and the predicted next shipping event.

7. The computer-implemented method of claim 6, wherein the predicted next shipping event is obtained by predicting the identity of the next shipping event based on the carrier, the most recent shipping event, and a delivery address of the package.

8. The computer-implemented method of claim 6, wherein generating the predicted time comprises determining the predicted time based on a previously computed average time between the most recent shipping event and the predicted next shipping event.

9. The computer-implemented method of claim 8, wherein generating the predicted time comprises
adding the average time to the time at which the most recent shipping event occurred to result in the predicted time; and
updating the average time upon determining an actual time between the most recent shipping event and the predicted next shipping event.

10. The computer-implemented method of claim 1, wherein the API is a first API and the carrier is a first carrier, and wherein the method further comprises:
receiving an indication that the next shipping event has occurred in response to retransmitting the tracking identifier to the first API;
predicting, based at least on an identity of the next shipping event, that the first carrier has changed or will change to a second carrier;
subsequently transmitting the tracking identifier to a second API of the second carrier instead of to the first API of the first carrier.

11. The computer-implemented method of claim 1, further comprising:
receiving an indication that the next shipping event has occurred in response to retransmitting the tracking identifier to the API, wherein the indication that the next shipping event has occurred includes the time at which the next shipping event occurred;
comparing the time at which the next shipping event occurred to the predicted time;
in response to the time at which the next shipping event occurred exceeding the predicted time by a particular amount: transmitting, to a device associated with a recipient of the package, an indication that delivery of the package may or will be delayed.

12. The computer-implemented method of claim 1, further comprising:
receiving an indication that the next shipping event has occurred in response to retransmitting the tracking identifier to the API;
comparing the next shipping event to a predicted next shipping event;
in response to the next shipping event not being equal to the predicted next shipping event: transmitting, to a device associated with a recipient of the package, an indication that delivery of the package may or will be delayed.

13. A system comprising:
a memory to store a tracking identifier for a package;
at least one processor configured to carry out a computer-implemented method comprising:
obtaining the tracking identifier from the memory;
transmitting the tracking identifier to an application programming interface (API) provided by a carrier, the API having a limit on how many API requests can be made by the computer, the transmitting occurring at a first frequency, and in response, receiving from the API an indication of a most recent shipping event for the package;
generating a predicted time of a next shipping event for the package, the predicted time generated based at least on the most recent shipping event;
establishing a time window within which the predicted time of the next shipping event falls; and
within the time window, retransmitting the tracking identifier to the API a plurality of times, the retransmitting occurring with increased frequency compared with the first frequency closer to the predicted time of the next shipping event,
wherein beginning at a particular point in time at or subsequent to the predicted time of the next shipping event:
when a response is not yet received from the API indicating that the next shipping event has occurred, the retransmitting the tracking identifier to the API the plurality of times comprises: retransmitting the tracking identifier with less frequency than the frequency at which the tracking identifier was retransmitted leading up to the predicted time of the next shipping event.

* * * * *